Jan. 5, 1971
H. SCHNORING ET AL  3,553,186
RECOVERY OF POLYMER FROM DISPERSION IN WATER
Filed Jan. 5, 1968
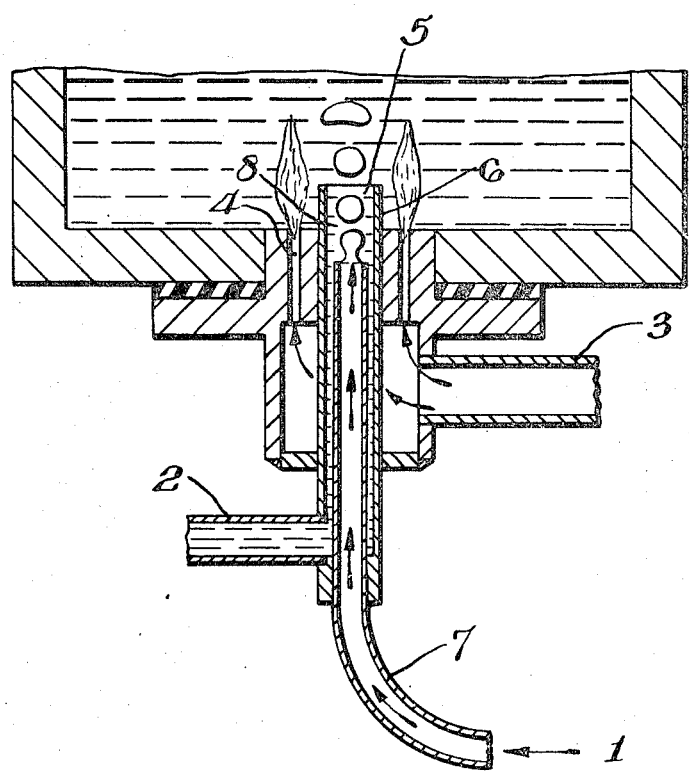

United States Patent Office 3,553,186
Patented Jan. 5, 1971

3,553,186
RECOVERY OF POLYMER FROM
DISPERSION IN WATER
Hildegard Schnoring, Wuppertal-Elbergeld, Willy Classe, Cologne-Stammheim, Diez Heine, Leverkusen-Kueppersteg, Herbert Nordt, Leverkusen, and Karl-Heinz Kreutzer, Cologne-Muelheim, Germany, assignors to Farbenfabriken Bayer Aktiengesellschaft, Leverkusen, Germany, a corporation of Germany
Filed Jan. 5, 1968, Ser. No. 696,053
Int. Cl. C08d 5/00, 5/04
U.S. Cl. 260—94.7                                5 Claims

ABSTRACT OF THE DISCLOSURE

Polymers such as olefin polymers are recovered from solution in volatile hydrocarbon or halogenated hydrocarbon like toluene or carbon tetrachloride, by dispersing the solution in a liquid like water which is substantially immiscible with the solvent and with the polymer and then introducing the dispersion into a body of heated liquid like water kept at a temperature that causes the solvent to rapidly vaporize off. Recovery of vaporized solvent is excellent and polymer is also easily separated out from the heated body of liquid. Streams of steam can be introduced into the body of liquid around the introduced dispersion. The process can be carried out on a continuous basis using streams of the liquids and solution, without much danger of clogging the solution-introducing means.

The present invention relates to the recovery of polymers from solutions in volatile solvents, and is an improvement on the recovery technique shown in German Auslegeschrift 1,179,375, published Oct. 8, 1964.

Among the objects of the present invention is the provision of novel techniques for making the above recoveries, including the effecting of the recoveries in a continuous trouble-free manner.

The above as well as additional objects of the present invention will be more readily understood from the following description of several of its exemplifications, reference being made to the accompanying drawing wherein the figure is a vertical sectional view of a portion of an apparatus in which the recovery of the invention can be practiced.

It has been discovered that the recovery of polymers as in the foregoing Auslegeschrift is made more trouble-free by first dispersing the polymer solution in a liquid substantially immiscible with the polymer as well as with the solvent, and then introducing the dispersion into the heated body of liquid that causes rapid vaporization of the solvent. The dispersion need not be very stable but can be quite unstable and quite coarse. While it is possible to have dispersing aids present in the dispersing liquid or the polymer solution, it is preferred that they not be used, particularly because they add to the expense of carrying out the invention. Other types of materials such as antioxidants or acid binding agents can be present to keep the polymers from degrading during the hot recovery operation or to keep the apparatus from being subjected to fumes such as HCl developed by chlorinated polymers or the like.

Water is a particularly desirable liquid to use both as dispersing medium as well as vaporizing medium. A little sodium bicarbonate dissolved in the water makes a very effective acid binding agent.

The heat required to cause vaporization of the polymer solvent can be supplied by heating in any way the body of liquid that causes the vaporizing. Where this liquid is water it is preferred to have most or all of the heat supplied in the form of steam which can be introduced at a very rapid rate. The steam can also be superheated and at high pressure to even further increase its heat content.

The recovery operation of the present invention is particularly effectively carried out in a continuous manner, with a stream of the polymer solution flowing into a nozzle through which a stream of water moves continuously into the body of heated liquid. The water stream disperses the polymer solution it receives, and carries the dispersed droplets of polymer solution into the body of heated liquid. In such a modification steam is preferably introduced into the body of heated liquid through a number of steam jets surrounding and closely adjacent to the nozzle discharge for the entering stream of water carrying dispersed polymer solution. This provides a direct heat supply in the location it is most needed. The rate of vaporization can then be controlled in some measure by changing the steam injection rate.

Basically, the process may be used to separate any polymers from organic solvents in which the polymers may be dissolved, suspended or emulsified. The solutions, suspensions or emulsions may also contain further constituents, i.e. it is also possible by virtue of the process according to the invention for example to work up polymer solutions having an aqueous phase emulsified in them.

Examples of suitable polymers include polyolefins and their copolymers, such as polybutadiene, polybutadiene-styrene, polyisoprene and elastomeric acrylonitrile-butadiene-styrene polymers, butyl rubber, polyethylene, polypropylene, ethylene-propylene copolymers, polyisobutylene, polyisoprene, and butadiene-dischloroethene copolymers, as well as chlorinated polymers of the above types and polymers of chlorinated olefins such as polyvinyl chloride, etc.

Aliphatic and aromatic hydrocarbons and their halogen derivatives such as, for example, hexane, heptane, benzene, toluene, carbon tetrachloride, chloroform, trichloroethylene, tetrachloroethylene, tetrachloroethane, chlorobenzene and dichlorobenzene are all examples of suitable solvents for these polymers.

The process according to the invention is particularly suitable for isolating chlorinated rubber from its solutions, suspensions or dispersions in organic solvents, particularly in carbon tetrachloride. For example chlorinated rubber may be in a solution in carbon tetrachloride into which an acqueous soda solution is additionally emulsified to neutralize any hydrochloric acid liberated.

In the process according to the invention the high surface tension of the high molecular weight solutions relative to liquids immiscible therewith facilitates the dispersion of the solution. No outside energy source is accordingly needed to form the dispersions and this makes the process very economical. Another advantage of the process according to the invention is that the formation of polymer filaments or plugs is avoided.

The organic solvent is not removed prematurely, i.e. in the nozzle itself, the drops of polymer solution being surrounded by immiscible liquid upon entry into the vaporizing chamber, so that there is no danger of obstruction, even in the event of fluctuations or failures in the delivery of the polymer solution. Accordingly, the process is largely unaffected by fluctuations in such factors as the working temperature, the throughput volume, consistency of the solvent and so on, so that it can be carried out without interruption over prolonged periods.

A still further advantage of the present invention is that the dispersing action helps the polymer-containing droplets move upwardly when they have a density greater than that of the body of liquid that causes vaporization.

In a tecnically preferred embodiment of the reaction, hot water at a temperature of from about 70° C. to 95° C. is used to fill a vaporizing column which can be one to ten meters tall and relatively narrow—30 cm. or less.

A stream of cold water in which for example a chlorinated rubber solution or suspension in a vaporizable organic solvent is distributed in the form of drops, issues from a nozzle arrangement at the bottom of the column. An upwardly directed flow of hot water is maintained in the reactor filled with hot water by blowing steam into it from an annular jet which is also arranged at the bottom of the reactor and which annularly surrounds the nozzle. The dispersion issuing through the chlorinated rubber nozzle is thus quickly heated so that the organic solvent is evaporated from the drops of the chlorine rubber solution, whilst the drops themselves ascend in the reactor. The chlorinated rubber particles which are formed in this way from the drops of the chlorinated rubber solution, overflow over the top of the column along with the water, are removed through a steam trap at the upper end of the column, and are separated from the water by conventional methods such as settling. The organic solvent escaping from the reactor in the form of a gas mixed with steam, is condensed by conventional methods and recovered.

The drops of the chlorinated rubber solution can be allowed to rise some 1.5 to 2 meters in the stream of warm water, whilst the dispersion of the chlorinated rubber in water is delivered through the nozzle at a temperature of from around 20° C. to around 50° C. The dispersion delivered by the nozzle is preferably prepared from 10% to 70% of water and 90% to 30% of polymer solution; that is water and polymer solution are delivered to the nozzle in a ratio by volume of around 1:9 to 7:3. This range is preferred for all polymers.

The apparatus in which the process according to the invention is carried out can use one or more three-component nozzles, a liquid-filled vaporizing chamber whose head is designed to function as a separator in which the steam is separated from the solid and liquid components of the reaction mixture, and a liquid level control. The solid/liquid mixture flows through a steam trap into a solid/liquid separator. The steam flows through a steam dome equipped with baffles in which any entrained liquid is removed, and then into a condenser. Although the horizontal cross-section of the vaporizing chamber may be constant, it is preferably not constant. It can widen conically from the bottom to about half-way up in order to provide an adequate residence time for the product. It can then taper down continuously toward the top in order to impart a sufficiently high rate of flow to the product at the outlet. The volume of the chamber should be such that the polymer has a residence time of from 0.1 to 10 seconds, and preferably 2 seconds. Smaller drops can have lower residence times. The liquids delivered to the chamber, preferably through a central tube in its base, is proportioned in such a way that the polymer mixture discharged over the top of the chamber is still free-flowing. The liquid separated in the liquid/polymer separator may be returned for delivery to the chamber through the inflow with fresh polymer solution.

A feature of the apparatus is the nozzle arrangement through which the polymer solution is delivered. One embodiment of this nozzle is shown in the drawing. This arrangement includes a mixer tube 6 in which is positioned a conduit 7 for the polymer solution 1. A water inlet 2 is connected to tube 6, and conduit 7 is recessed from the discharge end 5 of the tube to provide a mixing chamber 8 for the polymer solution and water. This mixing chamber should have a height at least two and preferably at least 2½ times the internal diameter of the mouth of conduit 7. An annular series of jets 4 with a steam inlet 3 arranged around the mixer tube provide for the introduction of the steam. Some of the mixer tube's exterior can be in direct contact with the introduced steam to warm up the water, if desired.

The following examples illustrate the invention, all percentages being by weight.

EXAMPLE I

A 10% solution of chlorinated rubber in carbon tetrachloride having emulsified into it 7% of a 3% solution of soda in water to neutralize any hydrochloric acid liberated, is delivered to inlet 1 of the nozzle arrangement shown in FIG. 1 at a rate of 500 l./hour. At the same time, 500 l./hour of water at 50° C. are fed into the water inlet 2. Droplets of the chlorinated rubber solution become dispersed in the water in mixing chamber 8 and flow through the nozzle 5 into the bottom of the vaporizing chamber, and after travelling a distance of a few millimeters, reach the steam zone in which the $CCl_4$ is spontaneously volatilized. $2.10^{-2}$ kg./sec. of steam at 6 atmospheres (gauge) are delivered into steam inlet 3 and blow out through jets 4. The distance from the bottom of the reactor to the overflow is 3.5 meters. The reactor has a capacity of 2.5 m.$^3$. The overall height of the apparatus is 5 meters, the steam dome with its baffles being 1 meter tall. The steam has to travel a distance of 3 meters through the baffled dome and is then condensed in a condenser, the condensate being delivered to a separator. The working temperature of the water is kept at 85–90° C. The liquid/solid separation of the outflowing mixture is effected by means of an oscillating screen with an effective area of 2 sq. meters. The apparatus operates continuously 24 hours a day over a period of months. 50 kg./h. of solid product are obtained, solvent recovery being 90% efficient.

EXAMPLE 2

A 15% solution of 1,4-cis-polybutadiene in toluene, which had been obtained by the polymerization of butadiene with an organometallic mixed catalyst and which had been stabilized by the addition of 0.5% of a phenolic antioxidant stabilizer and 1% of disproportionated abietic acid, is delivered to conduit 7 of the nozzle arrangement of FIG. 1 at a rate of 30 liters/hour. Water at the rate of 40 liters per hour and 3 m.$^3$ per hour of steam at 1 atmosphere (gauge) are consumed, the quantity of steam being sufficient to heat the mixture of water and solution delivered through the nozzle to 90–95° C., which is the temperature prevailing in the vaporizing chamber. This supplies about 20% of the required heat of evaporation of all the toluene present in the solution. The residual 80% of the heat of evaporation is fed to the reactor by indirect heat exchange with another steam line. The liquid/polymer separation of the outflowing mixture is carried out as described in Example 1.

It will be noted that the vaporizable solvent can have a boiling point higher than the maximum temperature in the vaporizing chamber. This is shown for instance in Example 2. By reason of the immiscibility of the solvent with the body of liquid in that chamber, the mixture will boil at a temperature somewhat below the normal boiling point of the lower boiling of these two materials. This is the basis for the effectiveness of steam distillation. For this reason the vaporizable solvent of the present invention can have a boiling point as much as 50° C. higher than that of the immisicible liquid in the vaporizing chamber.

Obviously many modifications and variations of the present invention are possible in the light of the above teaching. It is, therefore, to be understood that within the scope of the appended claims the invention may be practiced otherwise than as specifically described.

What is claimed is:

1. A process for recovering a polymer from its solution in a volatile, water-immiscible organic solvent which comprises introducing said solution into water at a temperature below that at which said solvent is volatile and thereby forming a dispersion of said solvent solution in water, introducing annularly arranged streams of steam underneath the surface of a body of water to maintain the temperature of said body of water adjacent to said streams at a temperature above the volatility point of said solvent and simultaneously and separately introducing said dispersion below the surface of said body of water and within the confines of said annularly arranged streams of steam to thereby volatilize said solvent and separate it from the polymer of said dispersion.

2. The process of claim 1 wherein said aqueous dispersion contains from 10 to 70% water by volume.

3. The process of claim 1 wherein said polymer is a polymer of an olefin hydrocarbon and the solvent is a hydrocarbon or halogenated hydrocarbon.

4. The process of claim 1 wherein said polymer is chlorinated rubber and said solvent is carbon tetrachloride.

5. The process of claim 1 wherein said polymer is polybutadiene and said solvent is toluene.

References Cited

UNITED STATES PATENTS

| | | | |
|---|---|---|---|
| 2,843,583 | 7/1958 | Voris | 260—223 |
| 3,287,301 | 11/1966 | Fysh et al. | 260—23.7 |
| 3,320,220 | 5/1967 | Di Drusco | 260—80.5 |
| 3,437,645 | 4/1969 | Paige et al. | 260—80.78 |

JOSEPH L. SCHOFER, Primary Examiner

W. F. HAMROCK, Assistant Examiner

U.S. Cl. X.R.

260—94.9, 816, 85.1, 80.78, 92.8, 96, 85.3, 94.8, 93.7, 88.2, 87.5